United States Patent
Burns et al.

(10) Patent No.: US 7,310,816 B1
(45) Date of Patent: Dec. 18, 2007

(54) SYSTEM AND METHOD FOR EMAIL SCREENING

(76) Inventors: Dale Burns, 6609 Shadow Crest, Plano, TX (US) 75093; Theodore Palles, 5645 Caruth, Dallas, TX (US) 75209

( * ) Notice: Subject to any disclaimer, the term of this patent is extended or adjusted under 35 U.S.C. 154(b) by 646 days.

(21) Appl. No.: 09/491,919

(22) Filed: Jan. 27, 2000

(51) Int. Cl.
*G06F 11/00* (2006.01)

(52) U.S. Cl. .............................. 726/24; 726/22; 726/23; 726/26; 726/30; 713/188; 709/206; 709/207

(58) Field of Classification Search ................ 713/201, 713/188, 152; 709/206, 207; 714/38, 39; 726/22, 23, 24, 25, 26, 30
See application file for complete search history.

(56) References Cited

U.S. PATENT DOCUMENTS

| | | | |
|---|---|---|---|
| 5,623,600 A | 4/1997 | Ji et al. ................. | 395/187.01 |
| 5,771,354 A | 6/1998 | Crawford ............... | 395/200.59 |
| 5,832,208 A * | 11/1998 | Chen et al. ................. | 713/201 |
| 5,864,683 A | 1/1999 | Boebert et al. ......... | 395/200.79 |
| 5,889,943 A * | 3/1999 | Ji et al. ...................... | 713/201 |
| 5,901,228 A | 5/1999 | Crawford .................... | 380/25 |
| 5,987,610 A * | 11/1999 | Franczek et al. ........... | 713/200 |
| 6,073,242 A * | 6/2000 | Hardy et al. ................ | 713/201 |
| 6,088,803 A * | 7/2000 | Tso et al. .................... | 713/201 |
| 6,192,114 B1 * | 2/2001 | Council ................ | 379/114.14 |
| 6,397,335 B1 * | 5/2002 | Franczek et al. ........... | 713/200 |
| 6,654,787 B1 * | 11/2003 | Aronson et al. ............ | 709/206 |
| 6,701,440 B1 * | 3/2004 | Kim et al. ................... | 713/201 |
| 2003/0191957 A1 * | 10/2003 | Hypponen et al. .......... | 713/200 |
| 2003/0196098 A1 * | 10/2003 | Dickinson et al. .......... | 713/188 |

* cited by examiner

*Primary Examiner*—Kim Vu
*Assistant Examiner*—Beemnet W Dada
(74) *Attorney, Agent, or Firm*—Roberts Mardula & Wertheim, LLC

(57) ABSTRACT

A system and method for e-mail screening to prevent the spread of viruses and to compensate users for viewing unsolicited e-mails. Users have all incoming e-mails redirected to a e-mail screening site. When the user registers with the server of the present invention, the user designates a password to the screening site and inform email senders of the password. When email comes to the user, it is redirected to the server site. IF a password is present in the e-mail it is sent directly back to the user. If there is no password present, the email is scanned and the sender is notified that, for a fee, the email can be forwarded to the user. If the sender pays the fee to the server site, the scanned email is forwarded and the fee is then shared with the user.

15 Claims, 2 Drawing Sheets

SYSTEM AND METHOD FOR EMAIL SCREENING

FIELD OF THE INVENTION

This invention related generally to sending and receipt of electronic mail over a network. More particularly, the present invention is a system and method for screening email for the presence of any virus and for generating revenue from the email screening activity.

BACKGROUND

It is frequently a problem that email received by an individual may contain a virus which is either specifically intended to infect the machine or is inadvertently attached by a known user to email being sent to a recipient. In either case, the end result is the recipient having the virus infect the system. Obviously, this can lead to disastrous results.

Email processing for various purposes has been the subject of invention. For example:

U.S. Pat. No. 5,889,943 to Ji, et al. describes a method and apparatus for virus detection for e-mail files. This patent describes a network of nodes separating servers that perform processing functions. Particularly, the system architecture allows e-mail messages to be sent to a separate server in order to be scanned. It does not deal with sorting of messages to be forwarded or otherwise identifying desired from undesired email.

U.S. Pat. No. 5,623,600 to Ji, et al. is related to the above-mentioned patent ('943). This patent describes a system for scanning files on a computer network for viruses. More specifically, the inventions include two methods that involve transferring email messages to a separate node in order for the virus scan to be performed. One embodiment provides detection from a gateway node for files sent to or from a network. Each method describes the scanning function as being performed by a separate server.

U.S. Pat. No. 5,832,208 to Chen, et al. describes a software program that scans for and removes viruses from e-mail messages, including attached files. One embodiment shows software used at the mail server of a Local Area Network (LAN) and operates within the mail system. The patent discusses applications for the program in a wide variety of computer architecture arrangements, including network operating systems and virus detection programs. However, this method is primarily based at the e-mail server. It does not deal with the sorting of email or revenue generation.

U.S. Pat. No. 5,901,228 to Crawford describes a system that allows on-line customers to directly access storage capability on a host system. One feature of the system is that the customer may purchase virus detection capability. However, several of the capabilities purchased, including virus detection require some virus-detection processing to be done at the customer's computer.

Anti-viral services are particularly described as being executable from either a virtual disk or copied onto the customer's hard drive.

The system described does operate when the user is off-line. The replica computer can act off-line and perform functions when the customer is not connected to the system.

U.S. Pat. No. 5,771,354 to Crawford is related to the above-mentioned patent ('228). This patent describes an on-line system where customers use the host system to perform storage and processing functions that were previously done on the customer's system. Specifically, the customer connects to the provider, pays a fee, and obtains the service. When the customer first contacts the provider, he must establish an identifier and password. Subsequently, the customer's access is permitted with entering the proper identifier and password. This service allows access by recipients of emails. It does not deal with the sender of email in any way.

U.S. Pat. No. 5,864,683 to Boebert, et al. describes a computer system that protects a private and secure system from infiltration while a secure user is accessing a wide-area access system. One embodiment describes a system where the secure user connection is processed by a secure server. The secure server isolates the private and wide-are access systems. The secure server is described as a non-distinguishing server that automatically reroutes information packets with a certain type of header for "off-line" inspection As seen in several of the patents discussed above, screening e-mail messages for virus infection via an off-line server is well known. While some patents address the purchase of a service by a recipient to screen e-mail for viruses, recipients are charged for performing the service of screening his or her e-mail for viruses.

These patents do not address connections that a user will make with third parties. None of the patents consider any way of recouping costs from third parties (senders of emails).

No other reference in the search describes a virus-screening system application that allows third party users of the customer's system to be charged when communicating with any user from the LAN.

What would be truly useful would be a system that allows emails and attachments to be screened, and which provides notification to both the user that such email has arrived and its potential subject matter, that allows a user to have email selectively screened, that provides notification to senders that a screening activity has taken place, and that makes a nominal charge to the sender for delivery of the scanned email.

SUMMARY OF THE INVENTION

It is therefore an objective of the present invention to allow email to be screened for viruses before the email is received by a user.

It is a further objective of the present invention to allow such virus screening to take place at a location other than the users computer.

It is a further objective of the present invention to re-route email to an alternate server for virus screening.

It is yet another objective of the present invention to be able to designate those emails that are to be sent directly to a users computer after screening.

It is a further objective of the present invention to limit the amount of unsolicited email received by a user.

It is a further objective of the present invention to develop revenue, with permission of a user, for the delivery of unsolicited email.

It is yet another objective of the present invention to be able to designate to an alternate site those emails that are not to be screened but to be sent directly to a user.

These and other objectives of the present invention will become apparent from a review of the specification that follows.

The present invention is an email screening system. The invention involves all email that is directed to a particular email address being rerouted to an alternate location. This is accomplished by the email recipient registering his or her address with an alternative location, which will be a server, of the present invention. Software that resides on the recipient's machine automatically reroutes the email to this alternative server.

At the alternative server, emails are scanned for any virus. If the email has a password associated with it, indicating that it is of somewhat higher importance than an un-passworded email, it is sent without delay to the recipient after it is scanned for viruses and confirmed that no viruses are present.

In the event that the email does not have a password, a notification is sent to both the intended sender and the intended recipient that the email did not include the necessary password. The intended recipient is then informed of the sender name, the date of the transmission, the time, the subject, and any other pertinent information that can be extracted from the email, but not any attachments that may be attached to the email. In this fashion, email can be scanned for viruses, but not forwarded to the intended recipient.

The sender of the un-passworded email is informed that for a nominal charge, the intended recipient will accept the email. The nominal charge covers the cost of running the service of the present invention. The nominal charge may then be shared by the emails between the screening system and the intended recipient, or, the nominal charge is simply kept by the web-based email screening system as payment for the screening service it provides.

For certain email, the intended recipient can designate that any email from a specific source be automatically accepted without being screened by the screening system of the present invention.

The present invention is directed to a System for purchasing the service of screening E-mail for viruses. A System user has screening software installed on his computer. The screening software forwards all email received to an alternate server. Each e-mail message is screened for viruses. If the e-mail message has a system password associated with it, no charge is applied for the screening. The message with the system password is then directly forwarded to the recipient. If the e-mail message does not have a system password, the E-mail Screening System requires the sender to pay a fee for the screening. Once no system password is found, the sender and recipient are each notified of the attempted delivery and required fee. If the sender pays the fee, the E-mail Screening System then delivers the message. Alternatively, the recipient can accumulate charges for messages from outside the system and pay the fee. Then, users do not experience delay in receiving messages.

DETAILED DESCRIPTION OF THE INVENTION

Figure 1:
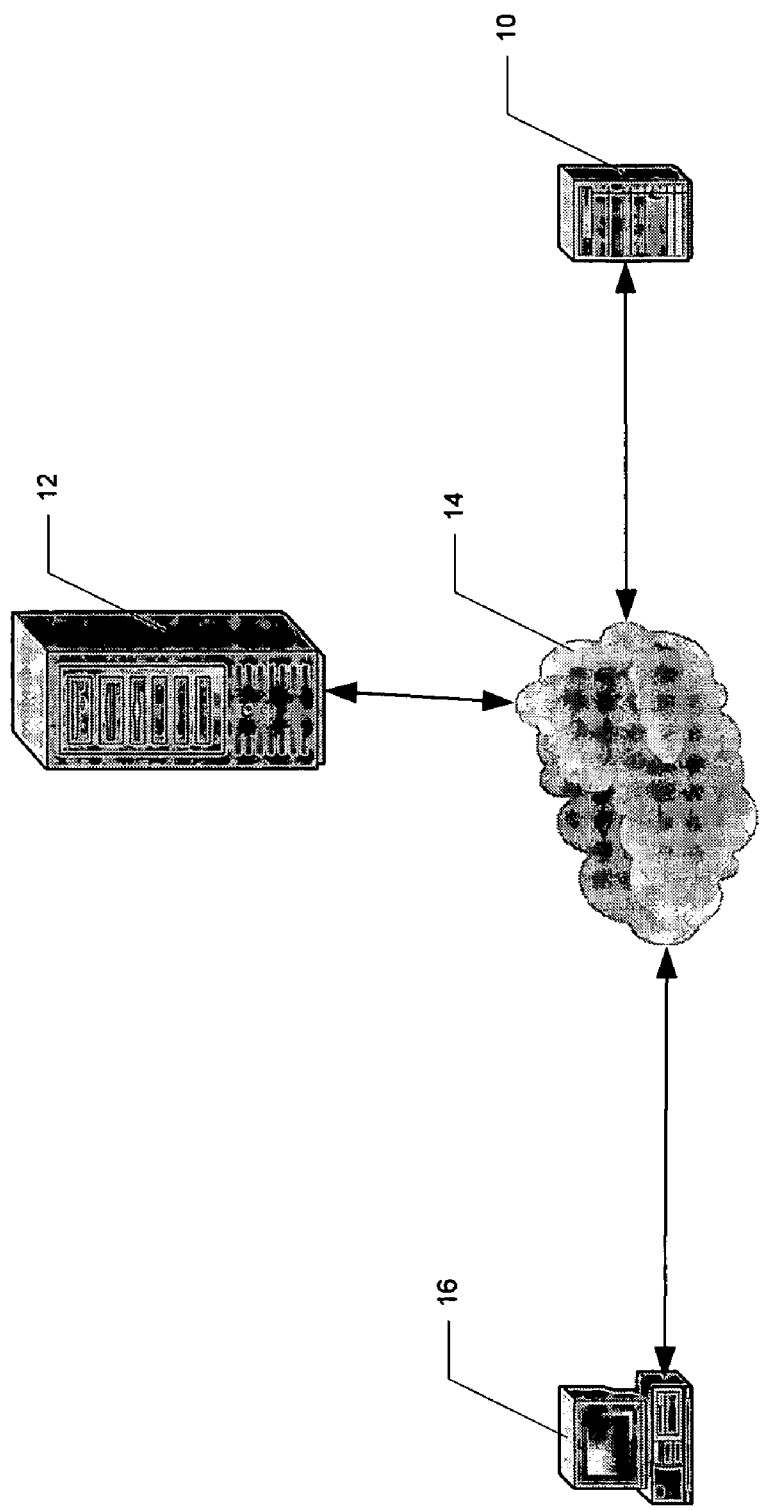
FIG. 1 illustrates the overall architecture of the present invention.

As noted above, the present invention is a system for screening email and generating revenue from the screening operations. Recipient computer 16 is connected to a network, preferably the Internet 14, although this is not meant as a limitation. For example, any other wide area network or intranet having email recipients and senders would be suitable for the present invention.

Email screening server 12 is also connected to the network 14. The email screening server 12 may operate on a wide variety of computers. A computer having memory, storage, and network connections as well as operating system software and software for executing email management functions.

Email sender 10 is also connected to network 14 and sends email in the typical fashion to recipient computer 16. Both the recipient computer 16 and the email sender 10 may be, a personal computer, such as an IBM PC, with an applications platform such as Windows™ or MacIntosh™, without limitation. The recipient computer 16 and email sender 10 include a processor, for example a Celeron 360 or a Pentium III, and memory for processing and storage.

In the present invention, recipient computer 16 has software to recognize when email is being received regardless of the source and redirecting that email over network 14 to screening server 12. Screening server 12 screens the email for any viruses and any passwords and performs additional functions for both recipient computer 16 and sending computer 10 as more fully described in FIG. 2 (below).

Figure 2:
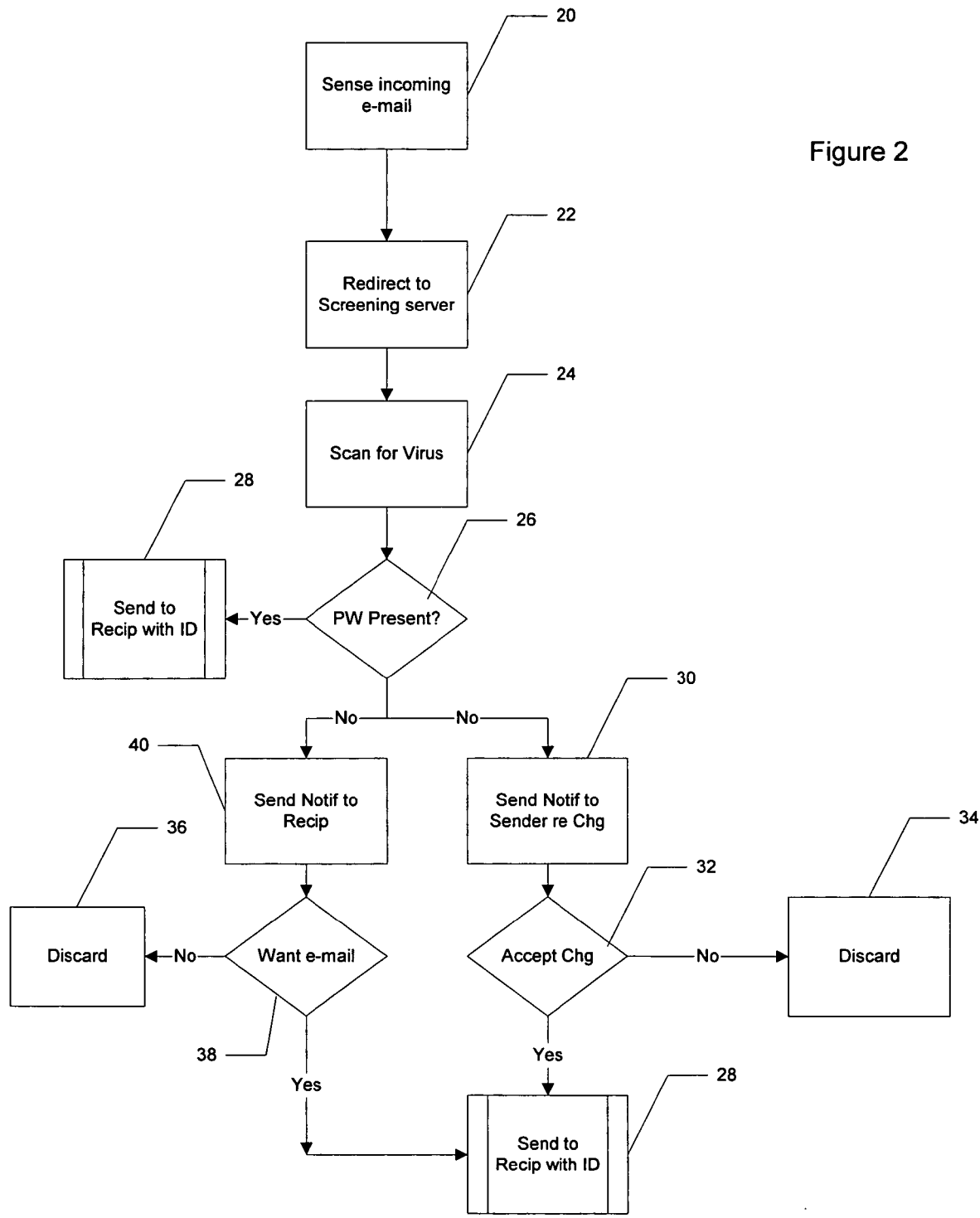
FIG. 2 illustrates the flowchart for email screening of the present invention.

Referring to FIG. 2, the overall flow of processing of email is illustrated. As noted above, recipient computer senses incoming email 20. Using software of the present invention email is redirected to screening server 22. Screening server then performs a scan of the redirected email for the presence of any virus 24. The screening server also scans to determine if any password is present 26.

If a password is present indicating a higher importance to the particular email that has been scanned, the email is sent, assuming there is no virus present, over the network to go with any attachments to the recipient 28. Any such email that is screened and where a password is determined to be present is reformatted and sent to the recipient with an appropriate identifier so that the screening software resident on the recipient's computer allows scanned email to be received and read at the recipient's computer.

If there is no password present 26, the system takes two actions.

The first action that is taken is that a notification is sent to the recipient that an email comprising no password has been received and scanned. The recipient is informed of the sender name, the date of transmission, the time, the subject, and any other pertinent information that can be extracted from the email, but not any attachments that may be attached to the email 40. In addition, a notification is sent to the sender 30 that its email has been received and that, in order to convey it to the sender, a charge for such a service will be made.

The email sender is given the option to accept the charge 32. Is the email sender does not wish to accept the charge the email is discarded 34 and it is not sent to the recipient. If however the sender accepts the charge for the service of forwarding the email 32, the email is subsequently sent with an appropriate identifier to the recipient 28 so that the software that is resident on the recipient's computer knows that the software has been scanned and can be accepted for reading.

If however after the sender is notified of the fact that email has been scanned but does not have a password 40, the sender is also asked if, given the information concerning the sender, time, subject matter, and other information, the recipient wants the email 38. If the recipient does not want to receive the email, the screening server discards the email 36. If however the recipient does wish to receive the email, the recipient is subsequently sent the email with the appropriate ID 28 to overcome the screening software at the recipient computer 16.

A key aspect of the present invention is that a business model for the receipt and screening of electronic mail at a nominal charge is established. The screening server receives the email as redirected from a recipient computer. Each time that a non-passworded electronic mail is determined by a sender to be worthy of a service charge, that service charge is made by the screening server and shared between the screening server and the recipient. In this way, the recipient is encouraged to receive email that has been screened, and further, the system enhances the electronic mail environment over networks by ensuring that all email is appropriately screened for virus content.

The system operates with conventional computer equipment. For example, the recipient computer can simply be an IBM pc or compatible or any other workstation now readily available to the public. The screening server can be a Sun Microsystems server or any other server capable of receiving large volumes of email and screening such email for the presence of any virus. The sending computer is also any computer that now exists that has the capability of sending electronic mail from one point on a network to another.

A system for screening email and generating revenue from that email screening activity has now been illustrated. It will be apparent to those skilled in the art that other embodiments of the present invention are possible without departing from the scope of the invention as disclosed.

As noted above, the software located on the recipient computer has a number of flexible functions associated with it. For example, the software can automatically screen for any names or addresses which are designated by the recipient as desirable to receive. Any such addresses so designated will not be redirected to the screening server. Further, any such address can also be provided to the screening server so that the screening server itself will simply redirect any email to the recipient without that email being screened.

We claim:

1. An email screening system comprising:
   a recipient computer connected to a network;
   an email screening server connected to the recipient computer over the network;
   a sender computer; connected to the recipient computer and the email screening computer over the network;
   wherein said recipient computer further comprises software instructions for forwarding all email messages received to the email screening server; and
   wherein the email screening server further comprises software instructions for screening the email for viruses and notifying the sender computer that the email will be forwarded to the recipient computer for a fee.

2. The email screening system of claim 1 wherein the recipient computer further comprises a password assigned to the recipient computer by the email screening computer.

3. The email screening system of claim 2 wherein the instructions stored by said email screening server further comprise software instructions for holding all email messages without the password.

4. The email screening system of claim 2 wherein the email screening server further comprises software instructions for alerting the recipient computer that an email message without the password is being held by the email screening computer.

5. The email screening system of claim 4 wherein the software instructions stored by the email screening server further comprise software instructions for charging the sender associated with a sender computer a fee to forward said email message without the password to the recipient computer.

6. A method for detecting viruses in email and administrating email for a recipient comprising:
   an email screening server connected to a network assigning a password to an email recipient connected to the network;
   software on a recipient computer rerouting email received by the email recipient computer to the email screening server over the network;
   screening the email by the email screening server for viruses;
   forwarding screened email to a recipient computer if the email possess a recipient password; and
   holding email at the email screening server when the email is without the recipient password.

7. The method of claim 6 further comprising:
   notifying the recipient computer that the email without the recipient password is being held;
   notifying a sender computer that the email without the recipient password is being held; and
   charging a sender associated with the sender computer a fee for sending the email without the recipient password.

8. The method of claim 7 further comprising:
   providing the recipient computer with the option to receive the email without the recipient password.

9. The method of claim 7 further comprising sharing the fee charged to the sender with the recipient associated with the recipient computer when the recipient computer accepts the email without the recipient password.

10. A method of virus screening of email comprising:
    a recipient computer re-routing received email from the recipient computer to a screening server over a network;
    the screening server scanning the email for a virus;
    the screening server notifying the sender computer of the email that the scanned email will be sent to the recipient computer for a fee;
    the screening server sending the scanned email to the recipient computer over the network if the fee is paid; and
    sharing the fee with a recipient associated with the recipient computer.

11. The method of virus screening of email of claim 10 further comprising:
    the screening server establishing a password for the recipient;
    the recipient notifying selected email senders of the password;
    the screening server scanning the email for the password;
    the screening server forwarding the email from the selected senders when the email possesses the password; and
    the screening server making no charge to the selected e-mail sender.

12. The method of claim 10 further comprising automatically forwarding email when said email message has an identification password.

13. The method of claim 10 further comprising:
    sending a notification message to said sender computer when an identification password is not detected; and
    charging a sender associated with the sending computer a fee to send said email to said recipient computer.

14. The method of claim 13 further comprising:
sharing a portion of said fee with said recipient.

15. The method of claim 10 further comprising:
sending a notification message to said sender computer and said recipient computer when an identification password is not detected; and providing a recipient with an option to pay for screening and sending said email when said sender does not pay for screening and sending said email.

* * * * *